(12) United States Patent
Gouveia et al.

(10) Patent No.: US 12,060,500 B2
(45) Date of Patent: Aug. 13, 2024

(54) ADHESIVE BASED ON MATERIALS CONTAINING LATEX AND LIGNIN AND PROCESS FOR PRODUCING SAME

(71) Applicant: CENTRO NACIONAL DE PESQUISA EM ENERGIA E MATERIAIS, Campinas (BR)

(72) Inventors: Rubia Figueredo Gouveia, Campinas (BR); Naima Mohamed Orra, Campinas (BR)

(73) Assignee: CENTRO NACIONAL DE PESQUISA EM ENERGIA E MATERIAIS, Campinas (BR)

( * ) Notice: Subject to any disclaimer, the term of this patent is extended or adjusted under 35 U.S.C. 154(b) by 945 days.

(21) Appl. No.: 17/054,636

(22) PCT Filed: May 13, 2019

(86) PCT No.: PCT/BR2019/050177
§ 371 (c)(1),
(2) Date: Nov. 11, 2020

(87) PCT Pub. No.: WO2019/213730
PCT Pub. Date: Nov. 14, 2019

(65) Prior Publication Data
US 2021/0071049 A1 Mar. 11, 2021

(30) Foreign Application Priority Data
May 11, 2018 (BR) .......................... 102018009673-7

(51) Int. Cl.
*C09J 107/02* (2006.01)
*C09J 11/08* (2006.01)
*C08K 3/26* (2006.01)

(52) U.S. Cl.
CPC ............. *C09J 107/02* (2013.01); *C09J 11/08* (2013.01); *C08K 3/26* (2013.01); *C08K 2003/262* (2013.01)

(58) Field of Classification Search
CPC ..................................................... C09J 107/02
See application file for complete search history.

(56) References Cited

U.S. PATENT DOCUMENTS

| 3,395,033 | A | 7/1968 | Remer |
| 8,409,403 | B2 | 4/2013 | Blount |

FOREIGN PATENT DOCUMENTS

| DE | 102012207868 A1 | 11/2013 |
| GB | 1480280 A | 7/1977 |

OTHER PUBLICATIONS

Derwent abstract 1993-006864 for SU 788677 A1, published Feb. 28, 1992.*
Bendahou et al., "Investigation on the effect of cellulosic nanoparticles' morphology on the properties of natural rubber based nanocomposites" European Polymer Journal, 20100401 Pergamon Press LTD Oxford, GB Source info:vol. 46, Nr: 4, pp. 609-620.

* cited by examiner

*Primary Examiner* — Vickey Nerangis
(74) *Attorney, Agent, or Firm* — FisherBroyles, LLP; Jason P. Mueller (57) ABSTRACT

A disclosed adhesive contains non-functionalized lignin and natural rubber latex in an aqueous medium having pH ≥9. The aqueous medium may further include 0.1% to 3% by mass of at least one alkali selected from the group comprising ammonium, sodium, calcium, magnesium, potassium hydroxides, and a salt such as sodium bicarbonate. A mass fraction of lignin may be between 0.1 and 20%, and the adhesive may include cellulose particulate material having sizes in a range between 5 µm and 5 nm, and/or fibrillated cellulose, and/or crystalline cellulose. The cellulose may have a dry mass fraction between 0.05 and 5%. A method of manufacturing may include forming a mixture by adding solid, non-functionalized lignin to a colloidal dispersion of natural rubber latex in an aqueous medium having pH ≥9, and stirring the mixture for a period of 10 to 20 minutes at room temperature and pressure.

10 Claims, 6 Drawing Sheets

ADHESIVE BASED ON MATERIALS CONTAINING LATEX AND LIGNIN AND PROCESS FOR PRODUCING SAME

This application is a national stage entry under 35 U.S.C. 371 of PCT Patent Application No. PCT/BR2019/050177, filed May 13, 2019, which claims priority to Brazil Patent Application No. BR102018009673-7, filed May 11, 2018, the entire contents of each of which are incorporated herein by reference.

DESCRIPTION FIELD

This disclosure refers to adhesive formulations based on materials containing natural rubber latex and lignin.

DESCRIPTION BACKGROUND

The first patent document describing the use of natural rubber latex as a raw material for adhesives was the US Pat. No. 3,965, dated Mar. 26, 1845. This patent describes a process of producing a tacking contact adhesive for use as a protective coating of textile bandages intended for medical applications.

Since then, natural rubber latex emulsions have been widely applied to contact adhesives intended for many substrates for presenting advantages when compared to polymeric latex such as acrylics, styrenes, butadienes and vinyl, among others. Among the advantages of the latex adhesives are the formation of homogeneous films by means of solidification by coalescence of polymer particles simultaneously with the evaporation of water present in the emulsion, the exemption from the addition of organic solvents potentially toxic to the environment to form films, the high compatibility with other chemical products in order to increase or improve the bonding functionality and the possibility of hot vulcanization.

To ensure the performance, stability and a long useful life of contact adhesive formulations based on natural rubber latex, it is common to add formulations with thickeners, preservatives or microbicides, humectants, antioxidants, defoamers, alkalis in a sufficient quantity to ensure a pH above 9, plasticizers, tackifying resins and solvents.

Traditional thickeners include soluble cellulose derivatives such as methyl cellulose, carboxymethyl cellulose or hydroxymethyl cellulose and their salts, alginates, gelatin, casein, starch, dextrose, xanthan and other low-molecular-weight carbohydrates, polymers derived from ethylene oxide and acrylates soluble in water.

Usual tackifying resins include terpene resins, coumarone-indene resins, natural resins such as lacquer, and long-chain hydrogenated resins, among other resins.

The most commonly used plasticizers include phthalate derivatives, for example, dibutyl and diethylphthalate.

The bonding of adhesives in common usage is controlled through the addition of release molded agents such as polyethylene, waxes and paraffins, or by the addition of polymer emulsions such as acrylates, acetates (for example, ethyl, butyl and vinyl), polyvinyl alcohol, and copolymers such as styrene/butadiene or styrene/acrylics.

The most commonly used alkalis are ammonium hydroxide and borax among several chemical bases. Usual solvents, in turn, come from the family of aromatics, mainly xylene and toluene. In general, the most commonly adopted defoamers include aliphatic alcohols and glycols.

Occasionally, formulations of adhesives based on natural rubber latex may be added by organic or mineral fillers such as earth alkaline metal oxides and carbonates, metal oxides, silica or carbon black, or cross-linking, curing or vulcanizing agents, generally derived from sulphur, peroxides, metal oxides, silanes or urethanes, or by antiflame agents, for example, bromine and phosphorous derivatives.

Some cellulose ethers soluble in water have application as thickeners in the manufacture of adhesives. Methyl cellulose (MC), carboxymethyl cellulose (CMC), hydroxypropyl methylcellulose (HPMC), hydroxypropyl cellulose (HPC) and its hydrophobically-modified forms both cationic and anionic (HMHPC), hydroxyethylcellulose (HEC) and its hydrophobically-modified forms both cationic and anionic (HMHEC), and ethyl hydroxyethyl cellulose (EHEC) are among the most used ethers in industry, but they are not limited to these compounds.

Cellulose in its pure form is a linear chain polysaccharide including bonding together of several hundred to thousands of units of D-glucose. The lengths of cellulose chain are different due to the nature of the biomass from which the cellulose is extracted. Celluloses from wood pulp such as eucalyptus or pine have typical chain lengths between 300 and 1700 units of glucose, while cellulose from fibrous species with the textile application such as cotton can have chains with up to 10000 units of glucose. Some of the properties of cellulose depend on this number of glucose units that determine its chain length, crystallinity or degree of polymerization.

Thus, the production processes of contact adhesives based on natural rubber latex added by different compounds are known.

Patent documents No. U.S. Pat. No. 2,373,597, GB729739, GB737742, U.S. Pat. No. 2,739,954, GB799424, U.S. Pat. No. 2,917,422, GB853518, GB906562, U.S. Pat. No. 3,152,921, GB1080441, GB1081291, FR1443217, BE679596, NL6617241, GB1192871, BE753691, DE2340856, U.S. Pat. No. 3,973,563, JP1295779, JP1288684, JPS55142033, JP1769699, U.S. Pat. Nos. 4,657,960, 4,684,685, JP2116351, JP3544379, JP2688689, U.S. Pat. No. 5,733,958, IN191547, U.S. Pat. No. 5,962,147, JP2002238360, IN2002DE00587, AU2002365368, U.S. Pat. No. 7,235,294, BRPI0505995, CN101967356, CN103360985, and CN106634681 are some examples of the formulation and application of contact adhesives based on natural rubber latex added by different substances applied for surface bonding or surface treatment of substrates.

The patent document No. PI 0102823-5 discloses a process for manufacturing adhesives for glass surfaces, ceramics, masonry and plastics based on natural rubber latex modified by polyphosphate, at room temperature and under stirring, resulting in a biodegradable aqueous based adhesive with high wettability, adhesion and coverage capability over the surfaces of the substrates above mentioned. In contrast, the technology proposed in this description does not need the addition of adhesive formulation by polyphosphate to improve adhesion to substrates of similar nature.

The Patent Document No. GB1455744 describes a process to produce an adhesive formulation based on natural rubber latex for attaching wood plywood. The aforementioned formulation promotes the stability of natural rubber latex by the inclusion of a non-ionic stabilizer or disulfides. The formulation is added by conventional vulcanization agents, inert fillers and extensors, and by synthetic resins in appropriate ratios by weight, such as urea-formaldehyde, phenol-formaldehyde or a mixture of urea-formaldehyde (75%) and melamine-formaldehyde (25%).

The Patent Document No. JP1761276 reports the production of panels from wood chips and nicks by using an adhesive based on natural rubber latex as a bonding element of the particles for subsequent hot-pressing of the panel. In order to give durability to the plate, a vulcanization agent is dispersed in the latex.

The teachings of this description differ from those above mentioned as they do not need the addition of additives and resins, and have the advantage of cold adhesion, without the need for hot curing of the adhesive by vulcanization.

The Patent Document No. PI 9603408-4 discloses a process of production of a non-toxic aqueous contact adhesive for boards including particle board, cork, wood, vinyl floors and polyvinyl chloride tiles, among other materials. This document differs from the description proposed herein as it contains in its composition the natural rubber latex associated with resins such as based on acrylic acid esters, polyvinyl acetate terpolymers, tackifying resins, elastomeric resins based on polyester polyurethane, and associated with other additives such as mineral fillers, so that it can meet its final purpose.

The use of cellulose nanocrystals and nanofibers was reported in patent document No. U.S. Pat. No. 6,103,790 as additives of latex emulsions for the production of water-based adhesives, paints and varnishes, as well as adjunct to the manufacture of films by evaporation or lyophilization of latex emulsions and the manufacture of objects by mechanical processes of compression or injection. However, the teachings of the priority above mentioned differ from those proposed herein regarding the origin and application of cellulose nanocrystals and nanofibers. In the above mentioned priority, the microcellulose comes from different algae and corded marine animals of the Tunicata subphylum, mainly from the Ascidiacea class. Celluloses from animal sources are essentially crystallines due to the fact that the intrinsic nature of their primary and secondary chains is interlaced in a disorderly manner, making the separation and dissolution thereof difficult, and promoting a grouping of crystalline regions that give a high degree of stiffness. The addition of cellulose in the above mentioned priority is implemented to give toughness to the films of adhesives, paints and varnishes, differing from the application as a rheological agent proposed for the micro- and nanocelluloses of plant origin of the disclosure proposed herein. Furthermore in the above mentioned priority, the additive latex emulsions are acrylic- or styrene-acrylic-based, unlike the emulsions based on natural rubber latex cited in this disclosure.

The addition of micro- or nanocellulose to the formulations of adhesives based on natural latex, as proposed in this disclosure, replaces cellulose ethers in their application as thickeners, and contributes to additional functionalities for adhesives, which are not made possible by the use of traditional thickeners in conventional approaches. The concentration of micro- or nanocellulose can be easily adjusted in adhesive formulations in order to obtain desirable rheological properties for the physical application of the adhesive.

The patent document No. KR 100673507 describes a process for producing a water-based environmentally-sustainable contact adhesive for paper gluing of substrates such as walls, floors and wood carpets, among others, with excellent paper adhesion to said substrates and offering high mechanical resistance. The said adhesive is a liquid emulsion of natural rubber latex in water, thickened by carboxymethyl cellulose (CMC), and does not present an ammonia odor, since the formulation is added with oxalic acid to promote the neutralization reaction of ammonia alkalis acids and attenuate the odor of the adhesive. Such adhesives based on natural rubber latex are susceptible over time to microbiological action, which promotes the breakage of polymer chains and negatively impacts properties for adhesive performance, for example by reducing its viscosity or promoting particle agglomeration and formation of granules. The use of thickeners based on cellulose ethers such as CMC further emphasizes the propension to microbiological attack. To mitigate this effect and extend the useful life of the adhesive, adhesives based on natural rubber latex and cellulosic thickeners are usually added with preservative agents and/or with a sufficient amount of alkalis to raise the pH above 10 in order to inhibit or delay the attack. Ammonia alkalis are the cheapest and most efficient for this purpose, but bring as an undesirable consequence the exhalation of strong odors during the drying or curing of the adhesive, which cause occupational exposure problems and damage to the health of workers. The technology proposed in this disclosure does not need the use of thickeners based on cellulose ethers since the viscosity adjustment takes place by the interaction of micro- and nanocellulose with latex. Cellulose in micro- and nanometric scale are less prone to microbiological attacks, and its application as thickeners in the technology herein proposed does not need to add a large amount of ammonia alkalis to raise the pH above 10 or add preservative agents to stabilize the formulation.

Processes of preparation of additives for composites by mixing natural rubber latex with nano- or microcrystals or cellulose fibers are used in applications other than those described in this application. The patent No. CN104530496 is one of the examples, where we have a suspension of cellulose nano- or microcrystals from recycled paper and paperboard, extracted by mechanical methods, and added to natural rubber latex. The suspension is produced by stirring, and additionally added with a suspension of $CaCl_2$ and carbon black.

The following stages are precipitation, washing and drying of the suspension in order to obtain a precipitate containing solid particles of natural latex and crystalline cellulose whose proposed application is that of additive for polymer and rubber composites. The presence of crystalline cellulose partially replaces the addition of carbon black to composites in order to improve its mechanical resistance. The additive can be processed into polymer and rubber composites by means of traditional production processes of several products based on rubber composites, such as hoses and tires.

The patent document No. CN107474343 presents another example of the use of natural rubber latex mixtures with cellulose nano- or microfibers, and describes a method for slowly mixing, under room temperature, a dilute latex of natural rubber to an emulsifier and crystalline nanocellulose from ascides to obtain a pre-mixture that will additionally be coagulated, dried and added to rubber compounds for further vulcanization.

Cellulose has been used in its non-functionalized form as a component of adhesive formulations in order to give greater mechanical resistance and toughness to the adhesive film coalesced after application and drying on the substrate, as reported by patent No. CN101864252. This patent document deals with the preparation of an aqueous-based adhesive formulation from the mixture of natural rubber latex, cellulose and talc, with low environmental impact and for use in gluing carpets and mats on similar floors and substrates.

The use of lignin as an additive for the production of polymeric and elastomeric compounds with differentiated mechanical and chemical properties are known. The patent document No. CN102718995 discusses non-vulcanized natural rubber reinforced by lignin, and its method of production. Industrial rubber reinforced by lignin is formed by the coagulation and drying of a lignin suspension mixed with natural rubber latex, plasticizers and oils, and offers a variation of formulation wherein lignin is added to the latex in aqueous suspension added by inorganic fillers. According to the teachings of said document, lignin is previously treated with chemical substances to promote anchoring to latex particles, thus promoting a greater speed in coagulation and drying processes without loss of the physical and mechanical properties of rubber, and reducing the energy consumption for the manufacture of rubber.

The possibility of using lignin or its derivatives as an anchoring agent is also known, and an example of an approach is described in the patent document No. JP2002226812, which deals with the production of an adhesive agent based on natural rubber latex added with lignosulphonic acid salts, configured to improve the anchoring of the carbon fiber surface so that they can be applied as reinforcing rubber fillers.

However, the application of lignin in a non-functionalized form as an ingredient in adhesive formulations has been investigated for decades and there are no records of success in this form of application, unless it is associated with other compounds such as furfuraldehyde or tannins, or functionalized through condensation reactions for example as glyoxal.

BRIEF DESCRIPTION OF THE OBJECT

It is disclosed an adhesive based on materials containing natural rubber latex and lignin in its non-functionalized form. In an embodiment, the adhesive further includes crystalline or fibrillated cellulose, in a micro- or nanometric scale, in its non-functionalized form.

It is also disclosed a process of production of said adhesive. This process includes: (i) adding lignin in solid form (powder) to a colloidal dispersion of natural rubber latex in aqueous medium with pH of 9 or greater; (ii) optionally adding crystalline or fibrillated cellulose to the dispersion; (iii) vigorously stirring the mixture for a period of time between 10 and 30 minutes in conditions of room temperature and pressure.

The adhesive resulting from this process is environmentally sustainable because it is water-based and does not require curing under temperature or pressure. This represents an improvement over conventional products because the disclosed adhesive can be used on disparate substrates, what could not be done previously, for example on the aluminum substrates.

DETAILED DESCRIPTION OF THE OBJECT

An adhesive based on materials containing natural rubber latex and non-functionalized lignin is disclosed.

In an embodiment of the disclosure, an adhesive is provided comprising a colloidal suspension of natural rubber latex in an aqueous medium mixed with non-functionalized lignin.

In an embodiment of the disclosure, the natural rubber latex is extracted in an ammonia solution, with pH ≥9 to prevent its coagulation. This solution includes 0.1 to 3% by weight of an alkali selected from the group comprising ammonium, sodium, calcium, magnesium, potassium hydroxides and salts such as sodium bicarbonate. Since lignin is solubilized only in basic aqueous medium, this characteristic allowed technical difficulties related to the preparation of the adhesive to be overcome, since it was not necessary to add components that change the pH of the aqueous medium in order to stabilize the suspension.

In an embodiment of the disclosure, an adhesive is provided comprising a colloidal suspension of natural rubber latex in aqueous medium mixed with lignin and micro- or nanocellulose in a crystalline or fibrillated form, the lignin and the cellulose being non-functionalized. It is noted in this embodiment that the addition of cellulose supports the dispersion of lignin, allowing an increase in the ratio of lignin in relation to the latex. The cellulose also has characteristics of thickening agent, which allowed some technical difficulties related to the preparation of the adhesive to be overcome.

In an embodiment of the disclosure the adhesive includes up to 5% nanocellulose and 0.1% to 20% lignin, both being expressed on dry mass basis, the mass ratio on a dry mass basis being complemented by the amount of latex.

In this disclosure, "natural rubber latex" includes the natural product registered under CAS number 9006-04-6, for example, from *Hevea brasiliensis*, being not restricted to this species and its origin.

In this disclosure, "lignin" includes the aromatic organic polymer of natural origin in its non-functionalized form, found in all vascular plants and component of the cell wall of fibers from woody and grass species consisting of cross-linking of phenolic groups in varying ratios, registered under CAS number 9005-53-2, and further includes the lignins extracted from these species through different processes, such as: lignin obtained by the organosols process, registered under CAS number 8068-03-9, the lignin obtained by the Kraft process, registered under CAS number 8068-05-1, and the alkali lignin obtained through the oxidation process, registered under CAS number 68512-36-7, being however not limited to these extraction processes.

In this disclosure, "cellulose" includes the cellulose polymer in its non-functionalized form, registered under CAS number 9004-34-6. Within the term "cellulose" used in this disclosure, different crystalline forms of the polymer are included, including micro- and nanocrystalline cellulose, and arrangements of cellulose macro-, micro- or nanofibers of different sizes and aspect ratios, referred to as cellulose micro- or nanofibrillated.

In this disclosure, micro- and nanocelluloses include partially depolymerized cellulose extracted from cellulose chains. Crystalline regions can be isolated and extracted from amorphous regions by mechanical and chemical processes, exposure to enzymes, vapor explosion or acid hydrolysis by using ionic liquids or mineral acids such as $H_2SO_4$, HCl and HBr. The degree of extraction can be controlled so as to generate micro- and nanocelluloses with a degree of polymerization typically below 400, thus being easily dispersed in water, and to present properties that cause the micro- and nanocelluloses to adapt their final application, such as controlled particle size (usually between 5 μm and 5 nm), low density, compressibility factor, angle of repose, porosity, sorption capacity, volumetric-expansion capacity, crystallinity index and size of crystallites, rheological functionalities and mechanical properties, such as high toughness and high tensile strength.

In this disclosure, micro- and nanocelluloses can come from wood species, such as eucalyptus and pine, fibrous species such as cotton, and sugarcane, being not limited to these species.

The adhesives disclosed herein can be used for gluing or surface finishing of metals or metal alloys, glass, plastics and cellulosic substrates of different compounds, the gluing being possible between substrates of the same nature, such as paper-paper, wood-wood, metal-metal, glass-glass, plastic-plastic or between substrates of distinct nature, such as wood-paper, paper-paperboard, metal-plastic.

The use of adhesive for gluing or surface finishing of cellulosic substrates refers to application on selected substrates selected from the group consisting of woods such as peroba, mahogany, golden trumpet tree, aroeira, oak, pine, eucalyptus, cedar, jacaranda, Santa Maria tree, macaw palm, itauba, and walnut, among others, wastes from wood processing and treatment, reclaimed woods, plywood produced from woods including MDF, MDP, among others, cellulose and its derivatives including in natura and bleached cellulosic pulp, cellulose fibers, cellulose films, cellulose composites, cellulose blankets and fabrics, regenerated cellulose, cellophane and its films and derivatives, among others, paper and its derivatives including cardboard, sulfite paper, among others, paperboard, packagings consisted of cellulose and its derivatives, fabrics produced from cellulosic fibers and compounds thereof. Said cellulosic substrates may have been subjected to surface treatments prior to the application of the adhesive, these treatments being selected from the group comprising spraying, brushing, polishing, application of paints, waxes, enamels, varnishes and/or greases.

The use of adhesive on metal substrates can be for adhesion or coating of metal substrates selected from the group comprising aluminum, brass, silver, gold, copper, stainless steel, platinum, iron, carbon steel of different compounds, or any metal alloy of these materials. These metal substrates may have been subjected to surface treatments prior to the application of the adhesive, these treatments being selected from the group comprising polishing, application of paints, waxes, enamels, varnishes or greases, oxidation, corrosion, anodization, buckling, corona discharge or electrical discharge, amalgamation, phosphatization, nitriding, sulfidation, carbidation, diamond-like coating, irradiation, coating with films through electrostatic paint, evaporation or electroplating.

The use of the adhesive on inorganic substrates may be for adhesion or coating inorganic substrates selected from the group comprising ceramics, glass, for example, comprising aluminum silicate, borosilicate, lime soda, cast silica and lead and silica plates. Said inorganic substrates may have been subjected to surface treatments prior to the application of the adhesive, these treatments being selected from the group comprising polishing, tempering, coloring, resin addition and blasting.

The use of adhesive on polymeric substrates can be for adhesion or coating of selected polymeric substrates of the group comprising elastomers of different origins and compositions, thermoplastics of different origins and compositions, thermosets of different origins and compositions, their composites and nanocomposites, their blends, foams and films, and fabrics produced from synthetic fibers and their compositions. These polymeric substrates may have been subjected to surface treatments selected from the group comprising polishing, blasting, ultraviolet irradiation, functionalization and dyeing by pigments.

In an embodiment of the disclosure, other ingredients are added to the adhesive formulation such as biocides, coalescents, pH correctors, rheological agents or viscosity adjustment agents, being not limited to the nature of these ingredients.

A process of production of said adhesive based on materials containing natural rubber latex and non-functionalized lignin is also disclosed.

In an embodiment, the process includes the stages of: adding lignin in solid form (powder) in a colloidal dispersion of natural rubber latex in an aqueous medium with a pH equal to or greater than 9; and, vigorously stirring the mixture for a period between 10 and 20 minutes, under temperature conditions and ambient pressure, with the use of a stirrer of any type, as an example a magnetic stirrer operating between 1350 and 1650 rpm.

In a disclosed embodiment, the process further includes the stage of adding micro- or nanocellulose to colloidal dispersion before stirring the mixture. The added cellulose may be fibrillated or crystalline micro- or nanocellulose, being in the form of aqueous dispersion with solid content of up to 5% on a dry mass basis, being in solid form (powder) or in the form of aqueous dispersion with solid content of up to 5% on a dry mass basis.

From this description, it is possible to make different compositions and apply different stages to prepare formulations varying in origin, structural nature, quantity and order of addition of their constituents, the composition of the solvent medium, the order of insertion of additives and ingredients, the solubilization temperature, the mixture stirring speed or time, being not limited to these process variables.

The disclosure can be better understood through the following non-limiting examples.

Examplary Embodiments

Example 1: Preparation of Adhesive Dispersions for Gluing Plywood

In this example, two formulations of contact adhesives were prepared that were compared regarding their adhesion performance to a commercial adhesive referred to as Cascola Cascorez Universal, a product of the Henkel multinational company. Cascola Cascorez Universal, cited in this and other examples, is a glue known to the consumer market, used for the same applications proposed for the adhesive of this disclosure. It is an aqueous dispersion based on vinyl polyacetate (PVA), for example, applied for contact adhesions by cold or hot pressing of porous materials such as wood artifacts, plastic laminates, paper and paperboard, thus comprising an appropriate reference standard to evaluate the performance of the formulations proposed in this disclosure.

The formulation 1 was prepared containing 95% latex: 5% lignin on a dry mass basis, and formulation 2 was prepared to contain 94% latex: 5% lignin: 1% nanocellulose on a dry mass basis.

The production process of both formulations included the initial addition of solid lignin to aqueous dispersion of natural rubber latex at pH ≥9 and then, only in the case of formulation 2, the fibrillated nanocellulose was added to dispersion. The lignin used comes from sugarcane bagasse, and the nanocellulose comes from eucalyptus. The lignin is in solid form (powder) and the fibrillated nanocellulose in the form of aqueous dispersion with a solid content equivalent to 2.1% on a dry mass basis of the solution. The resulting dispersion was left under magnetic agitation at 1500 rpm for 15 min at 25° C., and at the end of the agitation the lignin was completely dispersed in the medium, and the adhesive reached a viscosity suitable for application with roll-type applicator.

The adhesion efficiency of adhesive formulations 1 and 2 compared to that of the commercial formulation was assessed by a tensile test adapted from ISO 6237:2017. Sixty strips of plywood sized 8 cm×2.5 cm×1.2 cm were made. A layer of approximately 60 mg of the adhesive formulation to be evaluated (adhesive formulation 1, 2 or commercial formulation) was applied at 25° C. by using a roll-type applicator on the surface of a strip defining an adhesive area of 2 cm×2.5 cm in size and completely covering this area. After applying the adhesive formulation, the face of this adhesive impregnated strip was attached to the face of another strip without adhesive at a compressive force of approximately 4 N for 25 seconds. Thirty test specimens were prepared, ten for each formulation, which were conditioned by 120 h at 22±2° C. and 58±3% humidity and subsequently subjected to tensile test according to ISO 6237:2017, having been applied a tensile speed of 5 mm/min.

Figure 1:
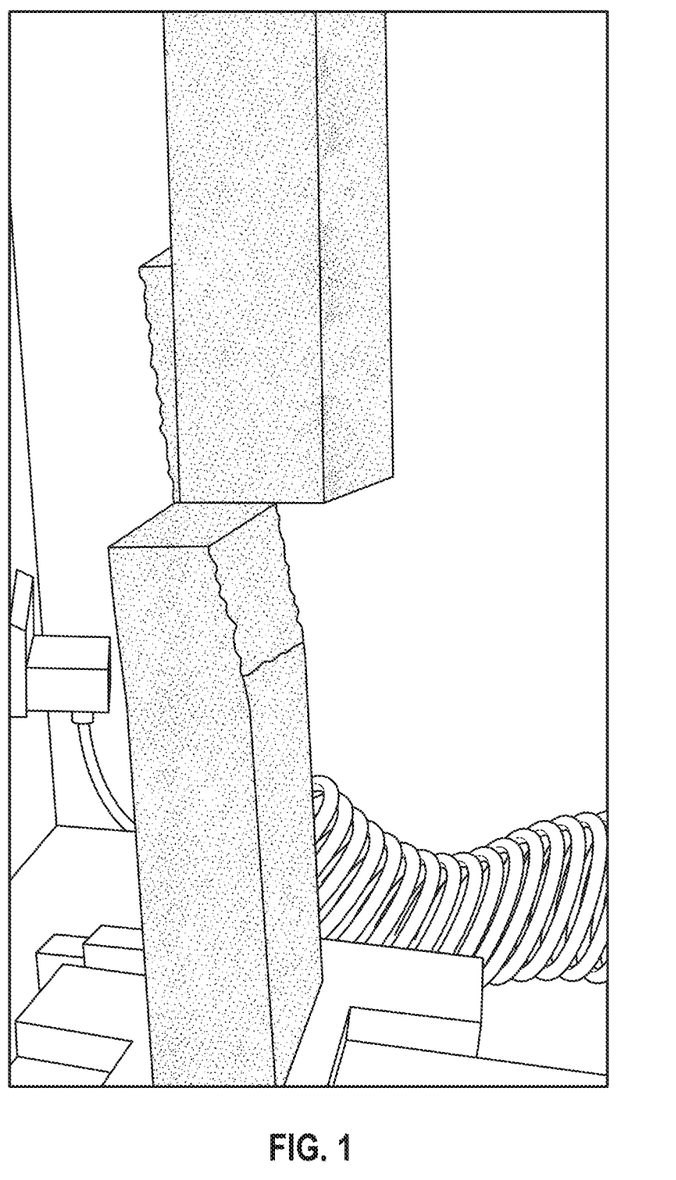
FIG. 1 is a photographic image of the rupture of a plywood test body subjected to tensile test, wherein the parts of the said body were adhered to by an embodiment of adhesive formulation of Example 1 of this disclosure.

FIG. 1 is a photographic image of the rupture of said plywood test specimens subjected to tensile test, wherein the parts of the said bodies were adhered to by adhesive formulation 1 produced in accordance with this Example 1. The rupture occurred in a portion of one of the test specimens, and not in the section joined by the adhesive, demonstrating good adhesion and shear strength of the plywood section joined by the adhesive.

Figure 2:
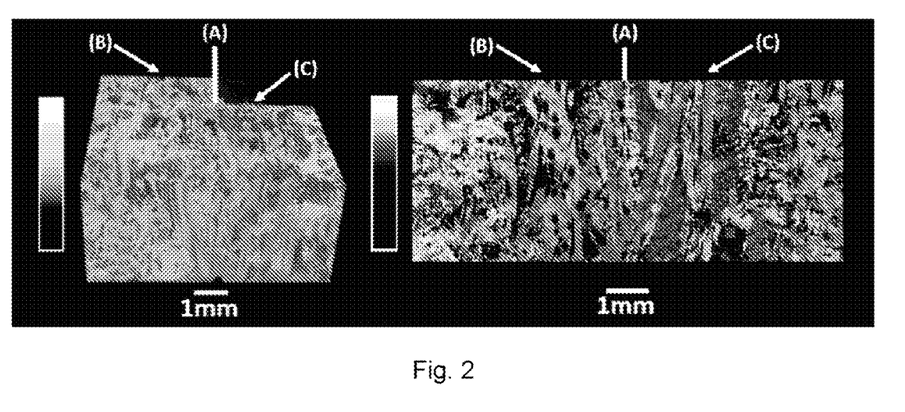
FIG. 2 presents images obtained by X-ray microtomography of the interface and the inner part of two plywood strips joined by an embodiment of adhesive formulation 1 of Example 1 of this disclosure.

FIG. 2 presents two images obtained by X-ray microtomography of the interface and the inner part of two plywood strips joined by the adhesive formulation 1 produced according to this Example 1, containing 95% latex and 5% lignin on a dry mass basis. To the left of the figure there is a three-dimensional (3D) image of the set, and to the right there is a two-dimensional (2D) image of a three-dimensional image cut inside the group.

In the images, it is possible to observe an adhesion region (A) that corresponds to the interface between two strips (B and C) joined by the adhesive film. The practically continuous phase in the adhesion region (A), where the adhesion occurs, points to a too non-pronounced interface due to the coalescence and drying of the adhesive film over the contact region of the test specimens, demonstrating excellent interaction between the woods and the adhesive.

Table 1 presents the results obtained for the modulus of elasticity (MPa) of formulations 1 and 2 compared to the performance of the test specimens glued by the commercial PVA formulation. The modulus of elasticity is expressed as the average of the moduli of elasticity measured for each set of 10 test specimens.

TABLE 1

Mean value of the modulus of elasticity obtained in the plywood tensile test for adhesive formulations 1 and 2 compared to the performance of the commercial formulation based on PVA.

| Adhesive composition | Formulation 1 95% latex: 5% lignin | Formulation 2 94% latex: 5% lignin: 1% nanocellulose | Commercial formulation based on PVA |
|---|---|---|---|
| modulus of elasticity (MPa) | 41 ± 11 | 94 ± 5 | 46 ± 12 |

Both adhesive formulations (1 and 2) presented similar performance to commercial adhesive for these substrates.

After the tensile test for formulations 1 and 2, it was observed that the test body was broken in a portion outside the adhesion region (A). FIG. 1 illustrates this result for formulation 1 and is complemented by FIG. 2 which presents the adhesive joint regions analyzed by X-ray microtomography with images of the adhesion region (A) containing the adhesive and strips (B and C). In FIG. 2, the micrographs on the left (3D image) and on the right (2D image) show a practically imperceptible interface between the two woods, denoting a good interaction among the two woods and the adhesive.

Example 2: Preparation of Adhesive Dispersions for Gluing MDF Wood

In this example, two formulations similar to Example 1 were prepared, and no performance comparison was made to the commercial adhesive, since Example 1 for wood substrate presented a similar performance among the formulations of this disclosure compared to commercial adhesive for these substrates.

Formulation 1 was prepared to contain 95% latex: 5% lignin on a dry mass basis, and formulation 2 was prepared to contain 94% latex: 5% lignin: 1% nanocellulose on a dry mass basis.

The process of production of both formulations included the initial addition of lignin to the aqueous dispersion of natural rubber latex at pH ≥9 and then, only in the case of formulation 2, nanocellulose was added to dispersion. The lignin used is from sugarcane bagasse, and the nanocellulose is from eucalyptus. The lignin is in solid form (powder), and the nanocellulose is in the form of aqueous dispersion with a solid content equivalent to 2.1% on a dry mass basis. The resulting dispersion was left under magnetic stirring for 15 min at 25° C. for proper homogenization, at the end of the stirring the lignin being completely dispersed in the medium, the adhesive being reached suitable viscosity for application with roll-type applicator.

The adhesion efficiency of adhesive formulations 1 and 2 was evaluated by a tensile test adapted from ISO 6237:2017. Forty strips of MDF wood sized 8 cm×2.5 cm×0.3 cm were made. A layer of approximately 60 mg of the adhesive formulation to be evaluated (adhesive formulation 1 and 2) was applied at 25° C. by using a roll-type applicator on the surface of a strip, defining an adhesive area of 2 cm×2.5 cm in size and completely covering this area. After applying the adhesive formulation, the adhesive-coated strip face was attached to the face of a strip without adhesive to a compressive force of approximately 4 N for 25 seconds. Twenty test specimens were prepared, ten for each formulation, which were conditioned by 120 h at 22±2° C. and 58±3% humidity and subsequently subjected to tensile test according to ISO 6237:2017, with a tensile speed of 5 mm/min applied.

Figure 3:
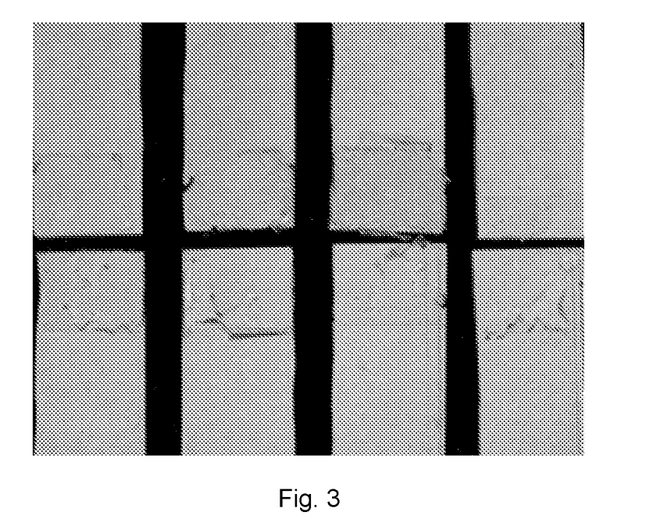
FIG. 3 is a photographic image of the rupture of MDF wood test specimens submitted to tensile test, wherein the parts of the said bodies were adhered by an embodiment of adhesive formulation of Example 2 of this disclosure.

FIG. 3 is a photographic image of the rupture of MDF wood test specimens subjected to tensile test, wherein the parts the said bodies were adhered to by the adhesive formulation 1 produced in Example 2 of this disclosure. The rupture occurred in a portion of one of the test specimens, and not in the section joined by the adhesive, demonstrating good adhesion and shear strength of the MDF wood section joined by the adhesive.

Figure 4:
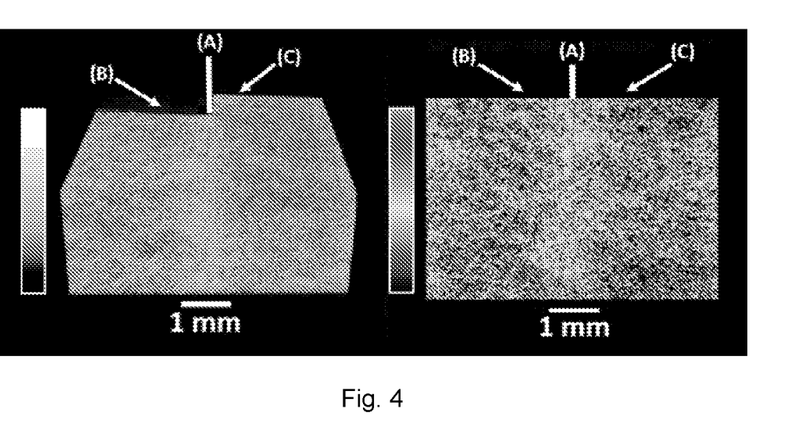
FIG. 4 presents images obtained by X-ray microtomography of the interface and the inner part of two MDF wood strips joined by an embodiment of adhesive formulation 1 of Example 2 of this disclosure.

FIG. 4 presents images obtained by X-ray microtomography of the interface and the inner part of two MDF wood strips joined by the adhesive formulation 1 developed in this Example 2, containing 95% latex and 5% lignin on a dry mass basis. To the left of the figure there is a three-dimensional (3D) image of the set, and to the right there is a two-dimensional (2D) image of a cut from the inner part of the set. In the images, it is possible to observe an adhesion region (A) that corresponds to the interface between two strips (B and C) joined by the adhesive film. The practically continuous phase in the region (A), where the adhesion occurs, points to a too non-pronounced interface due to the coalescence and drying of the adhesive film over the contact region of the test specimens, demonstrating excellent interaction among the woods and the adhesive.

Table 2 presents the results obtained for the modulus of elasticity (MPa) of formulations 1 and 2. The modulus of elasticity is expressed as the average of the moduli of elasticity measured for each set of 10 test specimens.

TABLE 2

Mean value of the elastic modulus obtained from MDF wood tensile test for adhesive formulations 1 and 2.

| Adhesive composition | Formulation 1 95% latex: 5% lignin | Formulation 2 94% latex: 5% lignin: 1% nanocellulose |
|---|---|---|
| modulus of elasticity (MPa) | 330 ± 70 | 321 ± 48 |

After the tensile test for formulations 1 and 2, the detachment of wood from one strip and the adhesion of this material to the face of the other strip of the test body were observed. FIG. 3 illustrates this result for formulation 1 and is complemented by FIG. 4 which presents the adhesive joint regions analyzed by X-ray microtomography with images of interface (A) containing the adhesive and strips (B and C). In FIG. 4, the micrographs on the left (3D image) and on the right (2D image) show a practically imperceptible interface between the two woods, pointing to a good interaction among the two woods and the adhesive.

Example 3: Preparation of Adhesive Dispersions for Gluing Sulfite Paper

In this example, two formulations were prepared, which were compared regarding their performance in adhering by using Cascola Cascorez Universal, a vinyl polyacetate-based (PVA) product of Henkel Company.

Formulation 1 was prepared to contain 95% latex: 5% lignin on a dry mass basis, and formulation 2 was prepared to contain 94% latex: 5% lignin: 1% nanocellulose on a dry mass basis.

The production process of both formulations included the initial addition of lignin to the aqueous dispersion of natural rubber latex at pH ≥9 and then, only for formulation 2, the fibrillated nanocellulose was added to the dispersion. The lignin used is from sugarcane bagasse, and the nanocellulose is from eucalyptus. The lignin is in solid form (powder), and the fibrillated nanocellulose is in the form of aqueous dispersion with a solid content equivalent to 2.1% on a dry mass basis. The resulting dispersion was left under magnetic stirring for 15 min at 25° C. for proper homogenization, at the end of the stirring the lignin being completely dispersed in the medium, the adhesive being reached suitable viscosity for application with roll-type applicator.

The adhesion efficiency of adhesive formulations 1 and 2, compared to that of the commercial formulation, evaluated by a tensile test adapted from ISO 1924-2:2008. Sixty strips of commercial sulfite paper were made sized 10 cm×2.5 cm×80 µm. A layer of approximately 60 mg of the adhesive formulation to be evaluated (adhesive formulation 1, 2 or commercial formulation) was applied at 25° C. by using a roll-type applicator on the surface of a strip, defining an adhesive area of 2 cm×2.5 cm in size and completely covering this area. After applying the adhesive formulation, the face of the strip was attached to a strip without adhesive at a compressive force of approximately 4 N for 25 seconds. Thirty test specimens were prepared, 10 for each formulation, which were conditioned by 120 h at 22±2° C. and 58±3% humidity and subsequently subjected to tensile test according to ISO 1924-2:2008, with a tensile speed of 7 mm/min applied. A preload of 6 N was used so that the test specimens were not curved at the beginning of the test.

Figure 5:
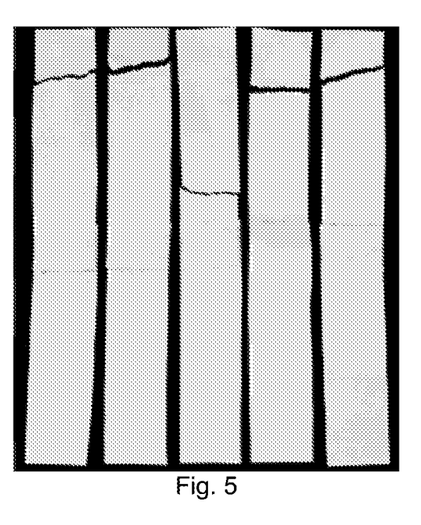
FIG. 5 shows a photographic image of the rupture of sulfite paper test specimens subjected to tensile test, wherein the parts of the said bodies were adhered to by an embodiment of adhesive formulation 1 of Example 3 of this disclosure.

FIG. 5 is a photographic image of the rupture of sulfite paper test specimens submitted to tensile test, wherein the parts of said bodies were adhered to by the adhesive formulation 1 produced in this Example 3. All the specimens were broke up in regions other than the gluing region, demonstrating a stronger paper-adhesive interaction than the paper-paper interaction. Similar behavior was also observed for the commercial adhesive tests, indicating that the developed adhesive has similar performance to the reference standard for these substrates.

Example 4: Preparation of Adhesive Dispersions for Gluing Paper

In this example, two formulations were prepared which were compared to Cascola Cascorez Universal, a vinyl polyacetate-based (PVA) adhesive from Henkel Company, regarding their performance in adhering.

Formulation 1 was prepared to contain 95% latex: 5% lignin on a dry mass basis, and formulation 2 was prepared to contain 94% latex: 5% lignin: 1% nanocellulose on a dry mass basis.

The production process of both formulations included the initial addition of lignin to the aqueous dispersion of natural rubber latex at pH ≥9 and then, only for formulation 2, the fibrillated nanocellulose was added to dispersion. The lignin used is from sugarcane bagasse, and the nanocellulose is from eucalyptus. The lignin is in solid form (powder), and the fibrillated nanocellulose is in the form of aqueous dispersion with a solid content equivalent to 2.1% on a dry mass basis. The resulting dispersion was left under magnetic stirring for 15 min at 25° C. for proper homogenization, at the end of the stirring the lignin being completely dispersed in the medium, the adhesive being reached suitable viscosity for application with roll-type applicator.

The adhesion efficiency of adhesive formulations 1 and 2, compared to that of the commercial formulation, evaluated by a tensile test adapted from ISO 1924-2:2008. Sixty strips of paperboard were made sized 10 cm×2.5 cm×0.12 cm. A layer of approximately 60 mg of the adhesive formulation to be evaluated (adhesive formulation 1, 2 or commercial formulation) was applied at 25° C. by using a roll-type applicator on the surface of a strip, defining an adhesive area of 2 cm×2.5 cm in size and completely covering this area. After applying the adhesive formulation, the face of this strip was attached to a strip without adhesive for 25 seconds at a compressive force of approximately 4 N. Thirty test specimens were prepared, ten for each formulation, which were conditioned by 120 h at 22±2° C. and 58±3% humidity and subsequently subjected to tensile test according to ISO 1924-2:2008, with a tensile speed of 6.5 mm/min applied. A preload of 6 N was used so that the test specimens were not curved at the beginning of the test.

Figure 6:
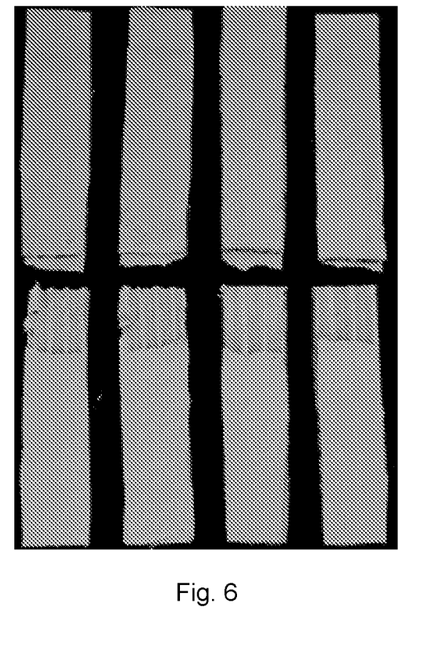
FIG. 6 shows a photographic image of the rupture of paperboard test specimens subjected to tensile test, wherein the parts of said bodies were adhered to by an embodiment of adhesive formulation 1 of Example 4 of this disclosure.

FIG. 6 is a photographic image of the rupture of paperboard test specimens subjected to tensile test, wherein the parts of the said bodies were adhered to by the adhesive formulation 1 of this Example 4. The rupture of the test specimens occurred in a portion adjacent to the adhesion region, demonstrating the strong attraction of the paperboard by the adhesive.

Table 3 presents the results obtained for the elastic modulus (MPa) of formulations 1 and 2 compared to the performance of the test specimens glued by the commercial formulation of PVA. The modulus of elasticity is expressed as the average of the moduli of elasticity measured for each set of 10 test specimens.

TABLE 3

Mean value of the elastic modulus obtained in the paperboard tensile test for adhesive formulations 1 and 2, compared to the performance of the commercial PVA formulation.

| Adhesive composition | Formulation 1 95% latex: 5% lignin | Formulation 2 94% latex: 5% lignin: 1% nanocellulose | Commercial formulation based on PVA |
| --- | --- | --- | --- |
| modulus of elasticity (MPa) | 59 ± 3 | 57 ± 3 | 60 ± 3 |

After the test, there was a disruption of all the test specimens outside the gluing zone, demonstrating a stronger paperboard-adhesive interaction than the paperboard-paperboard interaction. This result is illustrated for formulation 1 in FIG. 6, and similar behavior was also observed for commercial adhesive, indicating that the developed adhesive performs similar to the reference standard for these substrates.

Example 5: Preparation of Adhesive Dispersions for Gluing Paperboard and Sulfite Paper In this example, a single formulation was prepared which was compared regarding its performance in adhesion to Cascola Cascorez Universal, a vinyl polyacetate-based (PVA) adhesive from Henkel Company. The formulation was prepared to contain 95% latex: 5% lignin on a dry mass basis.

The production process included the initial addition of lignin to aqueous dispersion of natural rubber latex at pH ≥9. The lignin used is from sugarcane bagasse, and the nanocellulose is from eucalyptus. The lignin is in solid form (powder), and the fibrillated nanocellulose is in the form of aqueous dispersion with a solid content equivalent to 2.1% on a dry mass basis. The resulting dispersion was left under magnetic stirring for 15 min at 25° C. for proper homogenization, at the end of the stirring the lignin being completely dispersed in the medium, the adhesive being reached suitable viscosity for application with roll-type applicator.

The adhesion efficiency of the adhesive formulation compared to that of the commercial formulation was evaluated by a tensile test adapted from ISO 1924-2:2008. Twenty strips of sulfite paper sized 10 cm×2.5 cm×80 μm and 20 strips of paperboard sized 10 cm×2.5 cm×0.12 cm were made. A layer of approximately 60 mg of the adhesive formulation to be evaluated was applied at 25° C. by using a roll-type applicator on the surface of the paperboard strips, defining in these strips an adhesive area of 2 cm×2.5 cm in size and completely covering this area. After the application of the adhesive formulation, the faces of the paperboard strips were joined to the faces of the sulfite paper strips at a compressive force of approximately 4 N for 25 seconds. Twenty test specimens were prepared, 10 for each formulation, which were conditioned by 120 h at 22±2° C. and 58±3% humidity and subsequently subjected to tensile test according to ISO 1924-2:2008, with a tensile speed of 6.5 mm/min applied. A 6 N preload was used so that the test specimens were not curved at the beginning of the test.

Figure 7:
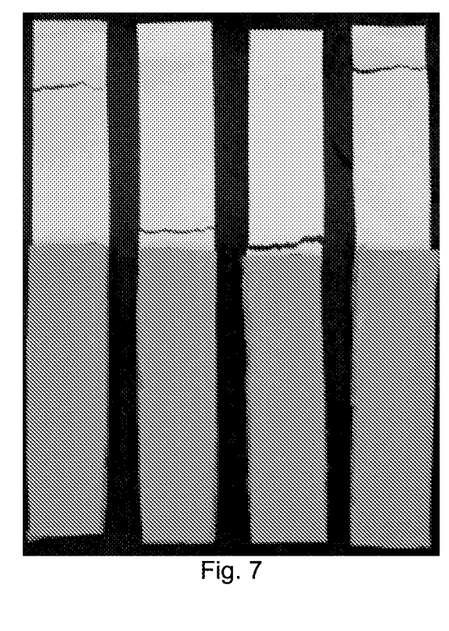
FIG. 7 is a photographic image of test specimens made of paper-paperboard subjected to tensile test, wherein the parts of the said bodies were adhered to by an embodiment of adhesive formulation of Example 5 of this disclosure.

FIG. 7 is a photographic image of test specimens made of paper-paperboard subjected to tensile test, wherein the parts of the said bodies were adhered to by the adhesive formulation produced in Example 5. All the test specimens broke up in regions other than the gluing region demonstrating a stronger paper-adhesive-paperboard interaction than the paper-paperboard interaction.

Table 4 presents the results obtained for the elastic modulus (MPa) of the developed formulation compared to the performance of the test specimens glued by the commercial PVA formulation. The modulus of elasticity is expressed as the average of the moduli of elasticity measured for each set of 10 test specimens.

TABLE 4

Mean value of the elastic modulus obtained in the paperboard and sulfite paper tensile test for the developed formulation compared to the performance of the commercial formulation based on PVA.

| Adhesive composition | Formulation 1 95% latex: 5% lignin | Commercial formulation based on PVA |
|---|---|---|
| modulus of elasticity (MPa) | 32 ± 5 | 33 ± 4 |

After the test, there was disruption of all the test specimens outside the gluing zone, demonstrating a stronger paperboard-adhesive interaction than the paperboard-paper interaction. This result is illustrated for the formulation developed in this disclosure in FIG. 7, and similar behavior was observed for commercial adhesive, indicating that the developed adhesive performs similar to the reference standard for these substrates.

Example 6: Preparation of Adhesive Dispersions for Aluminum and MDF Gluing

In this example, two adhesive formulations were prepared and tested, and no performance comparison was made to commercial adhesives due to the fact that this use is not recommended by the manufacturer.

Formulation 1 was prepared to contain 95% latex: 5% lignin on a dry mass basis, and formulation 2 was prepared to contain 94% latex: 5% lignin: 1% nanocellulose on a dry mass basis.

The production process of both adhesive formulations included the initial addition of lignin to the aqueous dispersion of natural rubber latex at pH ≥9 and then, only for formulation 2, the fibrillated nanocellulose was added to dispersion. The lignin used is from sugarcane bagasse, and the nanocellulose is from eucalyptus. The lignin is in solid form (powder), and the fibrillated nanocellulose is on the form of aqueous dispersion with solid content equivalent to 2.1% in mass on a dry basis of the dispersion. The resulting dispersion was left under stirring for 15 min at 25° C. for proper homogenization, at the end of the stirring the lignin being completely dispersed in the medium, and the adhesive having reached suitable viscosity for application with roll-type applicator.

The adhesion efficiency of adhesive formulations 1 and 2 was evaluated by a tensile test adapted from ISO 6237:2017. A layer of approximately 60 mg of each adhesive formulations 1 and 2 was applied at 25° C. by using a roll-type applicator on the surface of a strip of MDF defining an adhesive area of 2 cm×2.5 cm in size, and completely covering this area. After the application of the adhesive formulations, an aluminum profile with adhesive area of the same size and without adhesive application was pressed onto the MDF strip covered with the same adhesive composition, and the faces were joined for 15 min at 58% relative humidity at a compressive force of approximately 4 N. Sixteen aluminum test specimens were made sized 8 cm×2.5 cm, 8 for each formulation, which were conditioned by 120 h at 22±2° C. and 58±3% humidity. The test specimens were subsequently subjected to tensile tests according to ISO 6237:2017 and a tensile speed of 2 mm/min was applied. Similar behavior was observed for both formulations.

Example 7: Preparation of Adhesive Dispersions by Using Lignin from Eucalyptus or Sugarcane Bagasse for Gluing Plywood In this example, a single formulation was prepared which was compared regarding its performance in adhering by using Cascola Cascorez Universal, a vinyl polyacetate-based (PVA) adhesive from Henkel Company.

Formulation 1 was prepared to contain 95% latex: 5% lignin derived from sugarcane bagasse on a dry basis, and formulation 2 was prepared to contain 95% latex: 5% lignin derived from eucalyptus in dry mass. Formulation 3 was prepared to contain 94.9% latex: 5% eucalyptus derived lignin: 0.1% eucalyptus nanocellulose on a dry mass basis, and the formulation 4 was prepared to contain 94% latex: 5% eucalyptus derived lignin: 1% eucalyptus nanocellulose on a dry mass basis.

The production process included the initial addition of lignin derived from eucalyptus or, only in Example 1, of sugarcane bagasse to the aqueous dispersion of natural rubber latex at pH ≥9 and then, only in formulations 3 and 4, nanocellulose fibrillated was added to the dispersion. The used lignin comes from eucalyptus or bagasse, and the nanocellulose comes from eucalyptus. The lignin is in solid form (powder), and the fibrillated nanocellulose is in an aqueous dispersion form with solids content equivalent to 2.1% on a dry mass basis. The resulting dispersion was left under magnetic stirring for 15 min at 25° C. for proper homogenization, which ended when the lignin was completely dispersed in the medium, and the adhesive reached suitable viscosity for application with roll-type applicator.

The adhesion efficiency of adhesive formulations 1 to 4 was compared to that of the commercial formulation that was evaluated by a tensile test adapted from ISO 6237:2017 standard. One hundred plywood strips of 8 cm×2.5 cm×1.2 cm in size were made. A layer of approximately 60 mg of the adhesive formulation to be evaluated (formulations 1 to 4 or commercial formulation) was applied at 25° C. by using a roll-type applicator on the surface of a strip defining an adhesion area of 2 cm×2.5 cm in size and completely covering this area. After applying the adhesive formulation, the face of this adhesive impregnated strip was attached to the face of another adhesive strip with a compressive force of approximately 4 N for 1 min for gluing the substrates. Fifty test specimens were prepared, 10 for each formulation, which were conditioned by 120 h at 22±2° C. and 58±3% humidity and subsequently submitted to tensile test according to ISO 6237:2017, having applied a tensile speed of 1 mm/min.

Table 5 presents the results obtained for the modulus de elasticity (MPa) of formulations 1 to 4 compared to the performance of the test specimens glued by the commercial formulation of PVA. The modulus of elasticity is expressed as the average of the moduli of elasticity measured for each set of 10 test specimens.

TABLE 5

Mean value of the modulus of elasticity obtained in the plywood tensile test for adhesive formulations 1 to 5 compared to the performance of the commercial PVA-based formulation.

| Adhesive composition | modulus of elasticity (MPa) |
|---|---|
| Formulation 1 95% Latex: 5% sugarcane bagasse lignin | 12 ± 2 |
| Formulation 2 95% Latex: 5% *Eucalyptus* Lignin | 12 ± 2 |
| Formulation 3 94.9% Latex: 5% *Eucalyptus* Lignin: 0.1% Nanocellulose | 12 ± 2 |

TABLE 5-continued

Mean value of the modulus of elasticity obtained in the plywood tensile test for adhesive formulations 1 to 5 compared to the performance of the commercial PVA-based formulation.

| Adhesive composition | modulus of elasticity (MPa) |
|---|---|
| Formulation 4 94% Latex: 5% *Eucalyptus* Lignin: 1% Nanocellulose | 11 ± 2 |
| Commercial reference based on PVA | 18 ± 3 |

All adhesive formulations (1 to 2) presented performance similar to commercial adhesive.

Example 8: Preparation of Adhesive Dispersions by Using Lignin from Eucalyptus and Cellulose for Gluing Plywood In this example three formulations of contact adhesives have been prepared.

Formulation 1 was prepared to contain 94% latex: 5% lignin derived from eucalyptus: 1% nanocellulose on a dry mass basis. Formulation 2 was prepared to contain 89% latex: 10% lignin derived from eucalyptus: 1% nanocellulose on a dry mass basis. Formulation 3 was prepared to contain 87% latex: 12% lignin derived from eucalyptus: 1% nanocellulose on a dry mass basis.

The process of production included the initial addition of lignin derived from eucalyptus to the aqueous dispersion of natural rubber latex at pH ≥9 and then the fibrillated nanocellulose was added to the dispersion, and nanocellulose was also derived from eucalyptus. The lignin is in solid form (powder), and the fibrillated nanocellulose is in an aqueous dispersion form with solid content equivalent to 2.1% on a dry mass basis. The resulting dispersion was left under magnetic stirring for 20 min at 25° C. for proper homogenization, which ended when the lignin was completely dispersed in the medium, and the adhesive reached suitable viscosity for application with roll-type applicator.

Figure 8:
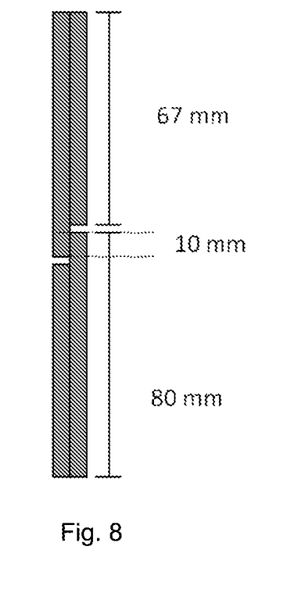
FIG. 8 is a schematic representation of a wooden specimen for tensile test as disclosed in Example 8 of this disclosure.

It is noteworthy that the solubilization of more than 6% lignin in latex was only possible due to the use of 1% nanocellulose in all formulations. In FIG. 8, it is possible to observe that the solubilization of 8% lignin in latex is only possible when adding 1% nanocellulose to the medium. Nanocellulose acts as a thickening/dispersant, supporting the solubilization of lignin.

The adhesion efficiency of adhesive formulations 1 to 3 was evaluated by a tensile test adapted from DIN EM 204/205:2003. Sixty plywood strips of 6.7 cm×2 cm×0.4 cm in size and sixty strips of 8 cm×2 cm×0.4 cm in size were made. A layer of approximately 150 mg of the adhesive formulation to be evaluated (adhesive formulation 1, 2 or 3) was applied at 25° C. by using a roll-type applicator on the surface of a 6.7 cm×2 cm×0.4 cm strip which was then glued to an 8 cm×2 cm×0.4 cm strip. A pressure of approximately 4 N for 1 min was maintained on this surface for effective gluing. The same process was repeated for another 6.7 cm long strip. Eventually, these two already glued parts were joined together by gluing a common area of 2 cm×1 cm in size to form a test body of 15 cm×2 cm×0.8 cm in size that had a notch of 3 mm in size on each side of the glued central area of 2 cm×1 cm in size. The central area was glued by using approximately 30 mg of adhesive under compressive force of approximately 4 N per 1 min. Thirty test specimens were prepared, ten for each formulation, which were conditioned by 420 h at 22±2° C. and 58±3% humidity and subsequently submitted to a tensile test according to DIN EN 204/205:2003, and a tensile speed of 50 mm/min was applied.

Figure 9:
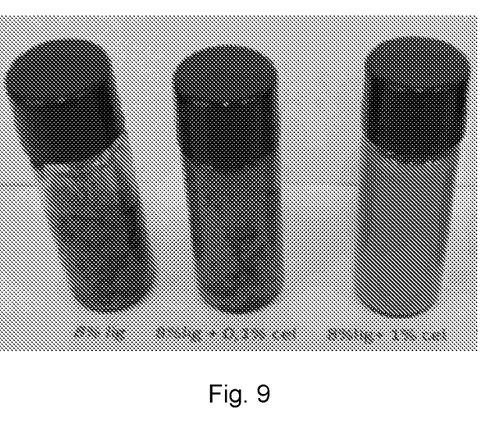
FIG. 9 is a photographic image of three embodiments of adhesive formulations in this disclosure.

FIG. 9 is a schematic representation of the test body for the tensile test on wood according to European standard DIN EN 204/205:2003, applied to this example.

Table 6 presents the results obtained for the modulus de elasticity (MPa) of formulations 1 to 3. The modulus of elasticity is expressed as the average of the moduli of elasticity measured for each set of 10 test specimen.

TABLE 6

Mean value of the elastic modulus obtained in the plywood tensile test for adhesive formulations 1 to 3.

| Adhesive composition | modulus of elasticity (MPa) | Maximum Strength (N) |
|---|---|---|
| Formulation 1 94% Latex: 5% *Eucalyptus* Lignin: 1% nanocellulose | 143 ± 18 | 248 ± 34 |
| Formulation 2 89% Latex: 10% *Eucalyptus* Lignin: 1% nanocellulose | 153 ± 22 | 270 ± 29 |
| Formulation 3 87% Latex: 12% *Eucalyptus* Lignin: 1% Nanocellulose | 163 ± 26 | 261 ± 45 |

All adhesive formulations (1 to 3) presented similar performance.

The examples described in this disclosure were realized from specimens glued with freshly prepared adhesives. However, adhesives stored by a month in a refrigerated environment and applied on the same substrates presented performances similar to the immediately prepared adhesives. It is believed that the preservation of the adhesive in part is due to celluloses in micro- and nanometric scale to be less prone to microbiological attacks, when compared to other additives, including cellulose-based additives with dimensions outside the micro- and nanoscales.

FIG. 9 is a photographic image of three adhesive formulations that have the same amount of lignin (8% on dry mass basis), but different amounts of nanocellulose. The formulation on the left has no nanocellulose, the formulation in the middle has 0.1% nanocellulose and the formulation on the right has 1% nanocellulose, all ratios expressed on a dry mass basis of the adhesive. The remaining percentage on a dry basis of each of these formulations is completed with latex. In this image, we can see how the increase in the concentration of nanocellulose supports the solubilization of lignin, acting as a thickening/dispersant for formulations.

The invention claimed is:

1. An adhesive containing latex and lignin, the adhesive comprising:
   non-functionalized lignin and natural rubber latex in an aqueous medium having pH ≥9 and cellulose sized at least between 500 nm and 5 nm, wherein the adhesive comprises between 0.1% and 20% of the non-functionalized lignin and between 0.05% and 5% of the cellulose, expressed on a dry mass basis.

2. The adhesive of claim 1, wherein the aqueous medium further comprises:
   0.1% to 3% by mass of at least one alkali selected from the group comprising ammonium, sodium, calcium, magnesium, potassium hydroxides, and a salt.

3. The adhesive of claim 2, wherein the salt includes sodium bicarbonate.

4. The adhesive of claim 1, wherein the cellulose comprises fibrillated cellulose.

5. The adhesive of claim 1, wherein the cellulose comprises crystalline cellulose.

6. A method of manufacturing an adhesive containing latex and lignin, the method comprising:
   forming a mixture by adding solid, non-functionalized lignin to a colloidal dispersion of natural rubber latex in an aqueous medium having pH ≥9;
   adding cellulose to the colloidal dispersion of natural rubber latex in an aqueous medium, wherein the cellulose has a size between 500 nm and 5 nm; and
   stirring the mixture for a period of 10 to 20 minutes at room temperature and pressure so as to form an adhesive that comprises between 0.1% and 20% of the non-functionalized lignin and between 0.05% and 5% of the cellulose, expressed on a dry mass basis.

7. The method of claim 6, wherein adding cellulose to the colloidal dispersion comprises adding crystalline cellulose.

8. The method of claim 7, wherein adding cellulose to the colloidal dispersion further comprises adding solid, powdered cellulose.

9. The method of claim 6, wherein the cellulose includes fibrillated cellulose.

10. The method of claim 6, wherein adding cellulose to the colloidal dispersion further comprises:
    adding an aqueous dispersion of cellulose with a solid content of up to 5% on a dry mass basis.

* * * * *